United States Patent
Krasula et al.

(10) Patent No.: US 7,636,048 B2
(45) Date of Patent: Dec. 22, 2009

(54) ELECTRONIC UNIT, ESPECIALLY FOR DETECTING LIVING ORGANISMS

(75) Inventors: L'uboš Krasula, Bánovce nad Bebravou (SK); Zdenko Karáč, Vráble (SK)

(73) Assignee: Ralen Research Centrum, s.r.o., Bratislava (SK)

(*) Notice: Subject to any disclaimer, the term of this patent is extended or adjusted under 35 U.S.C. 154(b) by 245 days.

(21) Appl. No.: 11/660,630

(22) PCT Filed: Sep. 7, 2005

(86) PCT No.: PCT/SK2005/000017

§ 371 (c)(1),
(2), (4) Date: Feb. 20, 2007

(87) PCT Pub. No.: WO2006/028423

PCT Pub. Date: Mar. 16, 2006

(65) Prior Publication Data

US 2007/0210925 A1    Sep. 13, 2007

(30) Foreign Application Priority Data

Sep. 7, 2004    (SK)    ................................ 249-2004 U

(51) Int. Cl.
    *G08B 23/00*    (2006.01)
(52) U.S. Cl. .............................. 340/573.1; 340/310.16; 340/686.1; 340/545.3
(58) Field of Classification Search ............ 340/573.1, 340/554, 555, 815.4, 573.3, 607, 310.06–310.08, 340/686.1, 545.3–545.566, 310.1
See application file for complete search history.

(56) References Cited

U.S. PATENT DOCUMENTS

| | | | |
|---|---|---|---|
| 3,863,240 A | 1/1975 | Galvin | ........................ 340/258 |
| 3,942,178 A | 3/1976 | Hackett | .................... 343/5 PD |
| 4,527,151 A * | 7/1985 | Byrne | ........................ 340/554 |
| 4,771,789 A * | 9/1988 | Namekawa | .................. 600/455 |
| 5,576,627 A | 11/1996 | McEwan | ..................... 324/639 |
| 5,861,806 A * | 1/1999 | Vories et al. | ................. 340/555 |
| 5,867,257 A * | 2/1999 | Rice et al. | ................... 356/28.5 |
| 5,977,878 A * | 11/1999 | Lang | ....................... 340/815.4 |
| 6,336,045 B1 * | 1/2002 | Brooks | ........................ 600/547 |
| 6,898,299 B1 * | 5/2005 | Brooks | ........................ 382/115 |

FOREIGN PATENT DOCUMENTS

WO    WO 03/090619 A1    11/2003

* cited by examiner

*Primary Examiner*—Daniel Previl
(74) *Attorney, Agent, or Firm*—Ohlandt, Greeley, Ruggiero & Perle, LLP; George W. Rauchfuss, Jr.; Charles N. J. Ruggiero

(57) ABSTRACT

A unit having a transmitting antenna (3a) and a receiving antenna (3b) connected through a coupling block (3) to a reference oscillator (1) and to a recording oscillator (2), the reference oscillator (1) is connected to a converter f/U1 (4) for measuring and changing frequency of the reference oscillator (1) to a voltage necessary for feedback check of the reference frequency, and to an analogue block (7) for measuring variation of the reference oscillator voltage. The recording oscillator (2) is connected to a converter f/U2 (5) for measuring and changing frequency from the detecting oscillator (2) to a voltage necessary for checking the received frequency. Converter f/U1 (4), analogue block (7), detecting oscillator (2) and converter f/U2 (5) are connected to a digital block (6) for recording, controlling, surveillance and regulating the respective operations and evaluating operation of the respective blocks. The digital block (6) is connected to the reference oscillator (1).

4 Claims, 1 Drawing Sheet

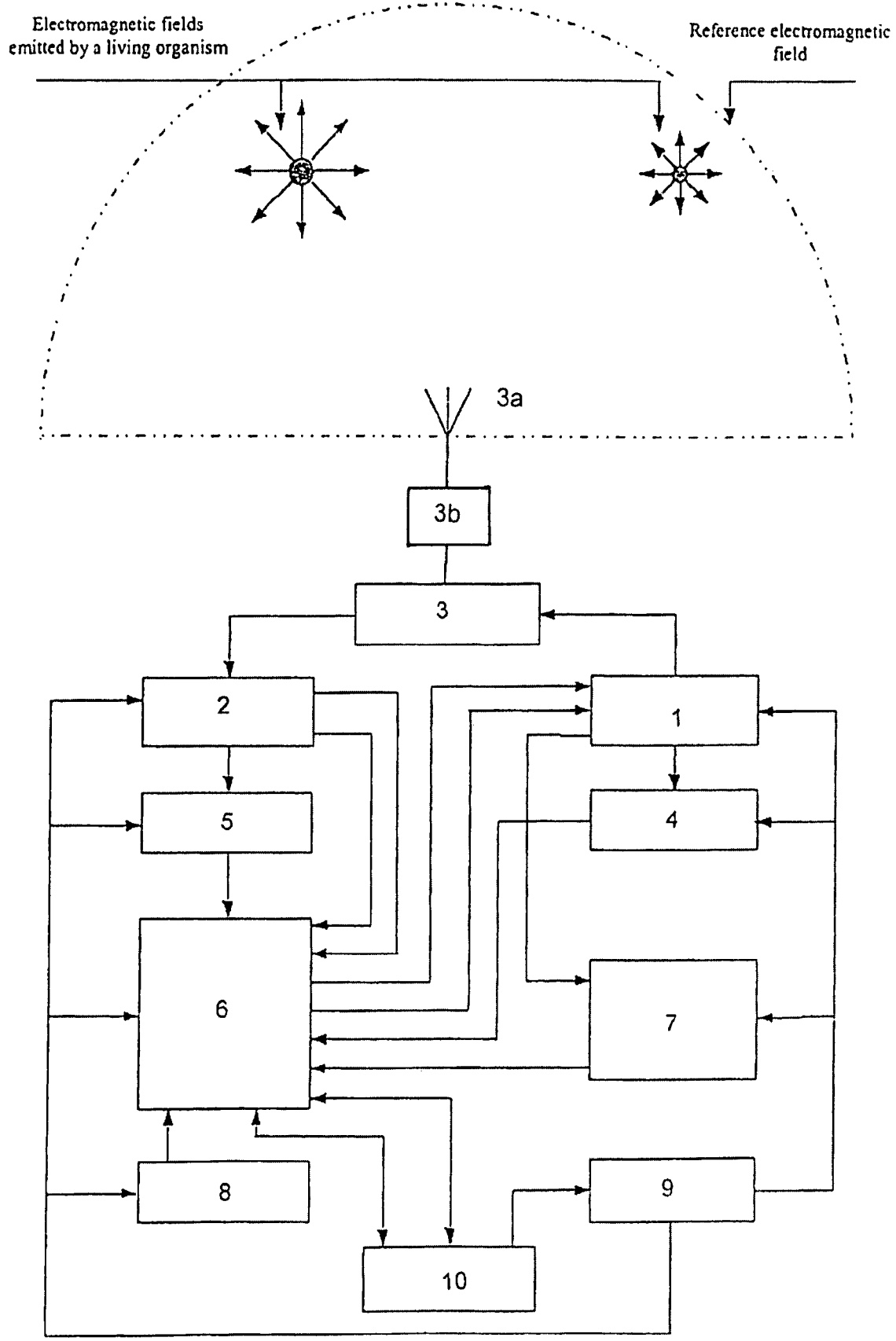

ELECTRONIC UNIT, ESPECIALLY FOR DETECTING LIVING ORGANISMS

TECHNICAL FIELD

The technical solution concerns an electronic unit, designed for controlling and assessing changes in electromagnetic fields, emitted by living organisms, with the aim to utilize the phenomenon in security and lookup techniques.

BACKGROUND ART

Recently, several methods are used in security techniques to detect persons or animals present in closed and open spaces. It concerns mainly devices utilizing the principles of infrared radiation, microwave radiation, ultrasound, X-ray radiation, changes induced by vibrations, changes of images recorded by camera systems, measurement of variation of capacitance. Also changes in optical fibres and in high-frequency electromagnetic fields are used to detect persons and animals.

When evaluating changes in high-frequency electromagnetic fields, in general a system is used, where the evaluating unit consists of two oscillators, of which one has a precisely set frequency and serves as a reference. The second oscillator is detuned by stray capacitance as a consequence of approaching persons, animals or things. The detuning is then measured and evaluated. Using this system, we are unable to distinguish, if the disturbance is caused by a person, animal or a thing. Moreover, stability of these devices is influenced by many different factors, like humidity, static discharges, movements of trees or other things in the electromagnetic field, unstable geomagnetic field of the Earth and the like, in consequence of which this method cannot be used in security technology.

With the above method, it is impossible to distinguish, if the electromagnetic field disturbance is caused by a living organism or another physical factor.

DISCLOSURE OF INVENTION

The above shortcoming is eliminated by the electronic unit according to this technical solution, the subject-matter of which consists in that a transmitting antenna and a receiving antenna are connected through a coupler to a reference oscillator intended for creating a reference electromagnetic field, and to a recording oscillator intended for recording the values of the electromagnetic field emitted by a living organism, frequency and demodulation of the received signals. The reference oscillator is connected to a converter f/U1 for measuring and converting frequency of the reference oscillator to a voltage necessary for feedback check of the reference frequency, and to an analogue block for measuring variation of the reference oscillator voltage. The recording oscillator is connected to a converter f/U2 for measuring and converting frequency from the recording oscillator to a voltage necessary for checking the received frequency. The converter f/U1, analogue block, recording oscillator and converter f/U2 are connected to a digital block for recording, controlling, supervision and regulating the respective operations and evaluating activity of the respective blocks. The digital block is connected to the reference oscillator, to a block of database of values to ensure measuring of specified values necessary for the correction and stabilization of the measurement, and to an input-output block. The reference oscillator, converter f/U1, analogue block, recording oscillator, converter f/U2, digital block, block of the values database and the input-output block are connected to a power block.

The electronic unit works on the principle of comparing electromagnetic fields. The reference electromagnetic field is created by means of the reference oscillator in the electronic unit by emitting signal at a precisely set frequency and power. Further electromagnetic fields are created by living organisms. The recording oscillator is connected to an antenna and detuned by electromagnetic waves, emitted by these living organisms. The detuning values of the oscillator are compared and measured values are digitally processed by a microprocessor of the digital block, where the information is compared and assigned to values, which have been defined in advance for the detected animal species.

An advantage of the electronic unit according to this technical solution is the fact that it can be effectively used in security and lookup techniques, especially for controlling presence of persons irrespective of the environment, in which they occur.

BRIEF DESCRIPTION OF DRAWING

The attached FIGURE shows a block diagram of the circuitry of an electronic unit for detecting living organisms.

EXAMPLE OF INVENTION EMBODIMENT

The electronic unit for detecting living organisms to be utilized in security an lookup techniques, as shown in the attached drawing, consists of the following parts:

A transmitting antenna $3a$ and a receiving antenna $3b$ are connected through a coupler 3 to a reference oscillator 1, and to a recording oscillator 2. A digital block 6 for modulating the carrier frequency and maintaining the power and stability of the reference electromagnetic field is connected to the reference oscillator 1 for creating the reference electromagnetic field, wherein the reference oscillator 1 is connected through its outputs to an analogue block 7 and a converter f/U1 4. The recording oscillator 2 for recording the values of the electromagnetic field emitted by a living organism and for recording frequency and demodulation of the received signals is connected to a converter f/U2 5 and to a digital block 6. The digital block 6 for recording, controlling, surveillance and regulating the respective operations is connected to the reference oscillator 1. The converter f/U2 5, recording oscillator 2, converter f/U1 4, analogue block 7, block 8 of database of values and input-output block 10 are connected to the digital block 6, wherein the input-output block 10 is connected to a power block 9 and supply the electronic unit with the external voltage. The power block 9 for supplying individual blocks with necessary voltages is connected to the reference oscillator 1, converter f/U1 4, analogue block 7, recording oscillator 2, converter f/U2 5, digital block 6 and block 8 of database of values.

Frequency of the electromagnetic field is created by the reference oscillator 1. Output of the reference oscillator 1 is connected to coupler 3, to which the transmitting antenna $3a$ is connected. The carrier frequency of the reference oscillator 1 is modulated by a coded digital signal from digital block 6. This modulation ensures that the reference electromagnetic field can be identified for each electronic device used. In the reference oscillator 1, there is regulated power and stability of the reference electromagnetic field. A further output of the reference oscillator is connected to the converter f/U1 4, which measures and converts the frequency of the reference oscillator 1 to a voltage, necessary for feedback check of the reference frequency. The frequency converted to voltage is delivered to the input of digital block 6. A further output of the reference oscillator 1 is connected to the input of analogue block 7, which measures magnitude variation of the reference electromagnetic field. Output of the analogue block 7 gives information on changes of the reference electromagnetic field magnitude and is connected to the input of digital block 6.

Value of the electromagnetic field emitted by a living organism is recorded by the recording oscillator 2, to which receiving antenna 3b is connected through coupler 3. Input of coupler 3 connects and adapts the output of the transmitting antenna 3a from the reference oscillator 1. Output of coupler 3 delivers the received signal to the input of recording oscillator 2, which records the values of the electromagnetic field emitted by a living organism. Simultaneously, it records frequency and demodulates received signals. Measured values of magnitude of the electromagnetic field of a living organism are transferred to the input of digital block 6. A further output of the recording oscillator 2 is connected to the converter f/U2 5. Converter f/U2 5 measures and converts frequency from recording oscillator 2 to voltage. Output from the converter f/U2 5 delivers the frequency converted to a voltage to digital block 6.

Block 8 of a database of values for correction and stabilization of the device parameters is connected to the digital block. Output of block 8 of database of values is connected to digital block 6 and sends the measured values (temperature, humidity, detector opening) to digital block 6. Digital block 6 with its software serves for recording, controlling, surveillance and regulating the respective operations and evaluates activity of the respective blocks. Input-output block 10, which ensures analogue and digital connection of the detector to the required devices (central PC and the like), is connected to digital block 6 through a bus, which allows two-way simultaneous communication.

Power block 9 supplies the respective blocks with necessary voltages.

REFERENCE SIGNS

1—reference oscillator
2—recording oscillator
3—coupler
4—converter f/U1
5—converter f/U2
6—digital block
7—analogue block
8—database of values
9—supply block
10—input-output block

The invention claimed is:

1. An electronic unit especially for detecting living organisms, wherein
    a transmitting antenna (3a) and a receiving antenna (3b) are connected through a coupler (3) to a reference oscillator (1) for creating a reference electromagnetic field of a reference frequency, and to a recording oscillator (2) for recording values of an electromagnetic field emitted by a living organism, wherein the reference oscillator (1) is connected to a converter f/U1 (4) for measuring and converting a frequency of the reference oscillator (1) to a voltage necessary for feedback check of the reference frequency, and to an analogue block (7) for measuring variation of reference oscillator voltage; the recording oscillator (2) is connected to a converter f/U2 (5) for measuring and converting a received frequency from the recording oscillator (2) to a voltage necessary for checking the received frequency; converter f/U1 (4), analogue block (7), recording oscillator (2) and converter f/U2 (5) being connected to a digital block (6) for recording, controlling, surveillance and regulating respective operations and evaluating activity of respective blocks, and wherein the digital block (6) is connected to the reference oscillator (1); a block (8), containing a database of values to ensure measuring of specified values necessary for correction and stabilization of parameters, and an input-output block (10) for ensuring bidirectional analogue and digital interconnection with security and lookup devices, are connected to the digital block (6), and wherein the reference oscillator (1), converter f/U1 (4), analogue block (7), recording oscillator (2), converter f/U2 (5), digital block (6), block (8) of the database of values and input-output block (10) are connected to a power supply block (9).

2. The unit of claim 1 wherein the reference electromagnetic filed is composed of a precise predetermined frequency and power.

3. The unit of claim 1, wherein the values of the reference electromagnetic field and the values of the electromagnetic field emitted by the living organism, are measured and compared by a microprocessor of the digital block (6).

4. The unit of claim 1, wherein the input-output block (10) is connected to digital block (6) through a bus allowing two-way simultaneous communication.

* * * * *